(12) United States Patent
Bolles

(10) Patent No.: US 11,187,113 B2
(45) Date of Patent: Nov. 30, 2021

(54) METHOD AND APPARATUS FOR ELECTRICAL POWER GENERATION FROM NATURAL GAS WITH ZERO CARBON EMMISION

(71) Applicant: Thomas R Bolles, Tucson, AZ (US)

(72) Inventor: Thomas R Bolles, Tucson, AZ (US)

( * ) Notice: Subject to any disclaimer, the term of this patent is extended or adjusted under 35 U.S.C. 154(b) by 0 days.

(21) Appl. No.: 17/088,226

(22) Filed: Nov. 3, 2020

(65) Prior Publication Data
US 2021/0131311 A1    May 6, 2021

Related U.S. Application Data

(60) Provisional application No. 62/930,707, filed on Nov. 5, 2019.

(51) Int. Cl.
| | |
|---|---|
| *F01K 5/02* | (2006.01) |
| *C05C 3/00* | (2006.01) |
| *F01K 23/10* | (2006.01) |
| *F01K 25/06* | (2006.01) |
| *F01K 3/18* | (2006.01) |

(52) U.S. Cl.
CPC ............... *F01K 5/02* (2013.01); *C05C 3/005* (2013.01); *F01K 3/188* (2013.01); *F01K 23/10* (2013.01); *F01K 25/065* (2013.01)

(58) Field of Classification Search
CPC . F01K 5/02; F01K 3/188; F01K 23/10; F01K 25/065; C05C 3/005; Y02P 20/129; F22B 1/1838
USPC .................................................. 60/670–684
See application file for complete search history.

(56) References Cited

U.S. PATENT DOCUMENTS

| | | | | |
|---|---|---|---|---|
| 2,824,058 | A * | 2/1958 | Zimmermann | ......... C02F 11/08 210/761 |
| 4,570,443 | A * | 2/1986 | Specht | ..................... B01J 3/002 60/670 |
| 8,596,067 | B2 * | 12/2013 | Conard | ................... F01K 13/00 60/651 |
| 2013/0153436 | A1 * | 6/2013 | Robertson | ................. C25C 7/02 205/560 |
| 2013/0287673 | A1 * | 10/2013 | Wang | ........................ C01F 5/24 423/431 |

* cited by examiner

*Primary Examiner* — Hoang M Nguyen
(74) *Attorney, Agent, or Firm* — Parsons & Goltry; Robert Parsons; Michael Goltry

(57) ABSTRACT

An electric power generating system includes an autoclave coupled to a natural gas source, an oxygen source, and having a pressure reducing outlet valve. A high-pressure pump provides a solution of ammonium hydroxide and ammonium carbonate solution under pressure to the autoclave. An exothermic reaction generates high-pressure steam for electrical power generation. A crystallizer receives ammonium carbonate from the reaction for the formation of crystallized ammonium carbonate fertilizer.

21 Claims, 1 Drawing Sheet

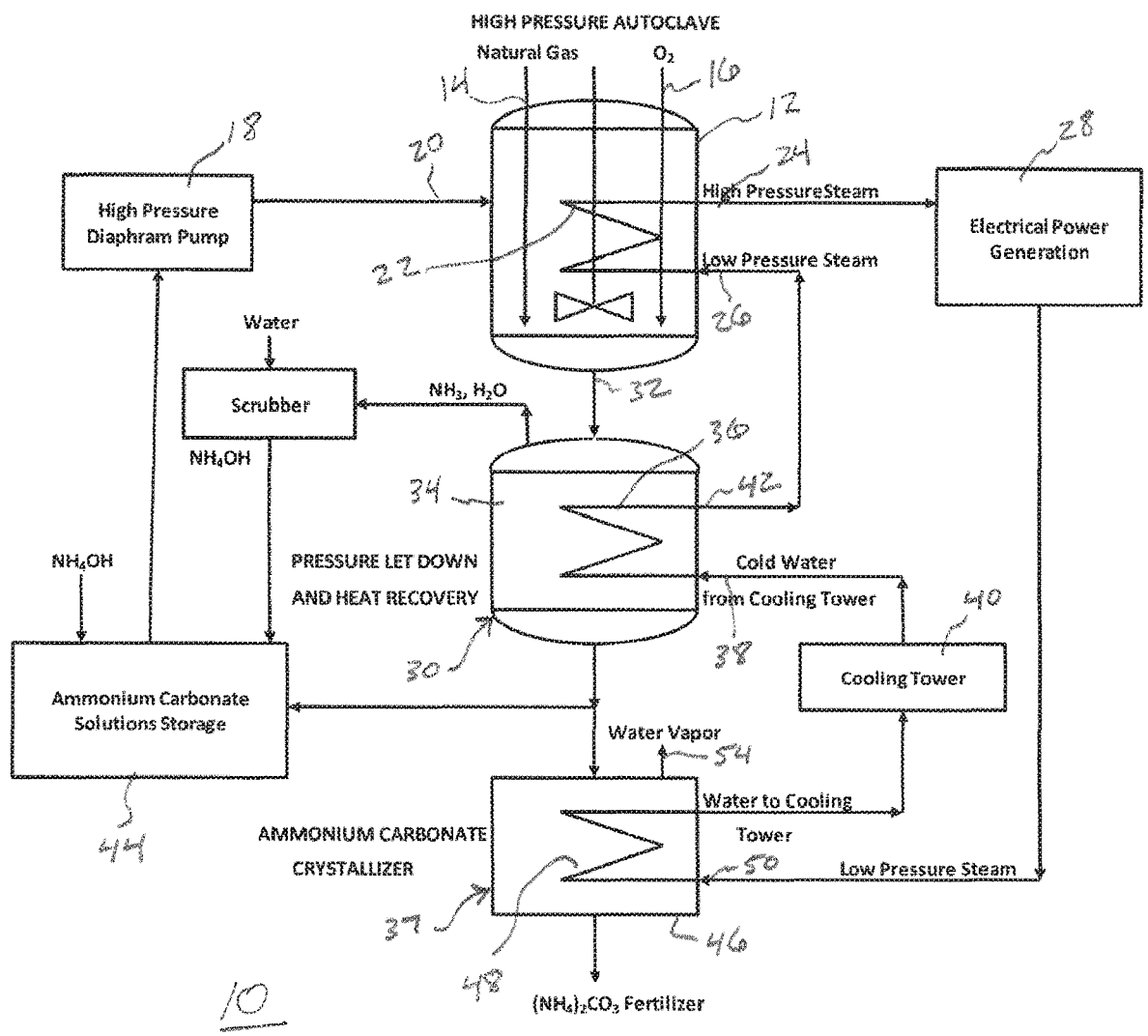

METHOD AND APPARATUS FOR ELECTRICAL POWER GENERATION FROM NATURAL GAS WITH ZERO CARBON EMMISION

CROSS-REFERENCE TO RELATED APPLICATIONS

This application claims the benefit of U.S. Provisional Patent Application No. 62/930,707, filed 5 Nov. 2019.

FIELD OF THE INVENTION

This invention relates to power generation.

More particularly, the present invention relates to zero carbon emission power generation from natural gas.

BACKGROUND OF THE INVENTION

Carbon emissions from various sources, including power generation, are a concern to many. Reduction or elimination of carbon emissions has become a desired outcome. Power is conventionally generated from fossil fuels such as coal and oil. While relatively cheap, use of fossil fuels for power generation releases a large quantity of carbon into the atmosphere. The release of carbon is mitigated by the use of natural gas instead of coal or oil. While cleaner burning, natural gas still releases carbon, albite at a reduced rate. While fossil fuels are plentiful and relatively cheap, currently, they cannot be used to generate power without carbon emissions. Power generated from nuclear reactors can greatly reduced or completely eliminated the release of carbon during power generation. However, nuclear energy presents its own list of problems, perceived problems and popularity or lack thereof, which prevents or reduces its use. Also, alternative renewable energy sources are available and in current use to provide clean energy. These primarily include solar, and wind powered generation. While effective in reducing carbon emissions during power production, the necessary structures needed such as solar panels and windmills are energy intensive to create, take large volumes of space to employ and are notoriously intermittent in their generation of power. Therefore, while fossil fuels are relatively inexpensive, currently plentiful and produce reliable power, they also release quantities of carbon into the atmosphere which is becoming unacceptable to many. Nuclear power, while clean from a carbon standpoint has not been acceptable for a variety of other reasons. Finally, renewable energy sources, while producing clean energy, are expensive, require a great deal of infrastructure, and are not a reliable source due to their intermittent production of power.

It would be highly advantageous, therefore, to remedy the foregoing and other deficiencies inherent in the prior art. Namely, to utilize a relatively cheap source of power generation such as fossil fuels to generate power without the release of carbon into the atmosphere.

SUMMARY OF THE INVENTION

Briefly, to achieve the desired objects and advantages of the instant invention, provided is an electric power generation system including an autoclave coupled to a natural gas source, an oxygen source, and having a pressure reducing outlet valve. A high-pressure pump is coupled to the autoclave for providing a solution of ammonium hydroxide and ammonium carbonate solution under pressure to the autoclave thereby creating an exothermic reaction forming an ammonium carbonate solution. A heat exchanger is coupled to the autoclave for generating high-pressure steam from heat created by the exothermic reaction. An electrical power generator is coupled to the heat exchanger for receiving the high-pressure steam to generate electrical power.

In a further aspect, a pressure let down system is coupled to the pressure reducing valve of the autoclave for receiving and cooling an ammonium carbonate solution from the autoclave. An ammonium carbonate crystallizer is coupled to the pressure let down system for receiving a first portion of the ammonium carbonate solution for the formation of crystallized ammonium carbonate fertilizer. A storage vessel is coupled to pressure let down system for receiving a second portion of the ammonium carbonate solution from the pressure let down system, the storage vessel is coupled to the high-pressure pump to provide ammonium carbonate solution thereto.

Also provided is a method of electric power generation including the steps of injecting natural gas, oxygen, a solution of ammonium hydroxide and ammonium carbonate solution into a high-pressure autoclave under pressure to create an exothermic reaction. High-pressure steam is created from the heat of the exothermic reaction and sent to an electrical power generator to generate electrical power. Additionally, a pressure reducing valve on the high-pressure autoclave can be provided to move ammonium carbonate solution from the high-pressure autoclave to a tank, with a portion of the ammonium carbonate solution recycled to the autoclave and a portion of the ammonium carbonate received in a crystallizer to form an ammonium carbonate fertilizer.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawing which is a schematic diagram illustrating the power generation system of the present invention.

DETAILED DESCRIPTION OF A PREFERRED EMBODIMENT

Electrical power generation from natural gas without carbon emission is provided by the power generation system and method of the present invention by reacting natural gas with oxygen in a high temperature/high-pressure environment containing a solution of ammonium hydroxide. Heat generated from this reaction produces steam which is used for electrical power production in a well-known manner. Resultant CO2 is converted in the system to fertilizer, removing it as an emission. The Ammonium hydroxide used in the system is generated in the system, as will be described presently. Thus, inputs to the system are natural gas, air and water, and the outputs are steam for power production and ammonium carbonate fertilizer.

Turning now to the drawing, a power generation system, generally designated 10, is illustrated. Power generation system 10 include a high-pressure autoclave 12 with an inlet 14 for natural gas and an inlet 16 for oxygen. High-pressure autoclave 12 is preferably a refractory lined steel autoclave vessel capable of operating at high temperature and pressure. The temperature in the autoclave will be between 180° C. and 265° C. (360-510° F.) and operate at pressures between 10 and 50 bars (140-725 psig). Natural gas is injected into autoclave 12 under pressure through inlet 14 and oxygen is injected into autoclave 12 under pressure through inlet 16. A high-pressure pump 18 is coupled to autoclave 12 through an inlet 20 to add a solution of ammonium hydroxide and recycled ammonium carbonate solution under pressure to high-pressure autoclave 12. In this preferred embodiment, high-pressure pump 18 can be any pump which is capable of injecting ammonium hydroxide and recycled ammonium carbonate solution at high-pressure into autoclave 12, and can include positive displacement pumps. Autoclave 12 operates at high temperature and pressure to encourage the methane/oxygen reaction. High temperature and pressure suppresses any reaction of oxygen with the ammonia. Oxygen is added in excess of stoichiometric to encourage the methane/oxygen reaction to produce CO2 and prevent the formation of hydrogen cyanide. The heat generated by the exothermic methane/oxygen reaction is collected by an internal heat exchanger 22 carried within autoclave 12. While an internal heat exchanger is preferred, it will be understood that other ways of coupling a heat exchanger to the autoclave can be employed. Heat exchanger 22 has an outlet 24 and an inlet 26. Outlet 24 is coupled to electrical power generator 28 and used to generate electrical power. Outlet 24 carries high-pressure steam to generator 28 and can be used in many different types of electrical power generators. Low-pressure steam exits generator 28 as waste heat from power generation. This low-pressure steam is used to generate crystalized ammonium carbonate, as will be described presently.

Carbon dioxide produced by the methane/oxygen reaction is absorbed by the ammonium hydroxide solution within autoclave 12. The resulting ammonium carbonate solution in autoclave 12 is discharged to pressure let down system 30 via a pressure reducing valve 32. Pressure let down system 30 reduces the pressure further by cooling the ammonium carbonate solution. System 30 includes a tank 34 receiving the ammonium carbonate solution from pressure reducing valve 32. The ammonium carbonate solution is cooled with internal coils 36 to minimize ammonia from flashing to the atmosphere before sending the ammonium carbonate solution to a crystallizer 37. While internal coils are preferred, other methods of coupling coils to the tank, such as externally can be employed. Coils 36 have an inlet 38 coupled to a cooling tower 40 and receiving cold water therefrom, and an outlet 40. Outlet 40 is coupled to inlet 26, providing low-pressure steam resulting from the extraction of heat from the ammonium carbonate solution within tank 34 to autoclave 12.

The cooled ammonium carbonate solution from tank 34 is divided and sent to crystallizer 37 and an ammonium carbonate solution storage vessel 44. Crystallizer 37 includes a vessel 46 carrying an internal heat exchanger 48. While an internal heat exchanger is preferred, other methods of coupling heat exchangers to the vessel, such as externally, can be employed. Heat exchanger 48 has an inlet 50 coupled to generator 28 for receiving the low-pressure steam therefrom and an outlet 52 coupled to cooling tower 40. Heat is exchanged between the ammonium carbonate solution within vessel 46 and heat exchanger 48 resulting in formation of crystallized ammonium carbonate fertilizer. Some water vapor and ammonia may escape through a release valve 54 at this point in the process. While crystallizer 37 is an evaporative crystallizer, the ammonia may flash, so an alternative would be to use a chilled crystallizer.

The portion of the ammonium carbonate solution transferred to ammonium carbonate solution storage vessel 44 is fortified with the addition of ammonium hydroxide. ammonium hydroxide is added to the recycled ammonium carbonate solution at a rate to maintain the concentration of ammonium carbonate near saturation. The rate of ammonium hydroxide added will be a slight excess of the stoichiometric amount need to react with CO2. The amount bled to the crystallizer will maintain the concentration of ammonium carbonate near saturation and maintain the carbon/water balance.

This process can operate as an integrated plant to produce electrical power with a byproduct of ammonium carbonate fertilizer. The integrated plant produces ammonium hydroxide from hydrogen and nitrogen using new ammonia technology licensors such as KBR (Kellogg Brown and Root), Haldor Topsøe, and TKIS (ThyssenKrupp Industrial Solutions).

The chemistry of the process includes the following steps. Hydrogen is made by reforming natural gas in a two-step process.

Reformed Natural Gas for Hydrogen Production

   (1)

Water/Gas Shift Reaction

   (2)

CO2 Scrubbing

   (3)

Overall Hydrogen Production Reaction

   (4)

Ammonium Hydroxide Production

   (5)

   (6)

Oxygen and Nitrogen Made from Air Using Industrial Processes to be Used in Ammonia Production and Reacting with Methane in the High-Pressure Reactor.

Pressure Swing Adsorption

   (7)

Natural Gas and Oxygen Reactions in an Autoclave

   (8)

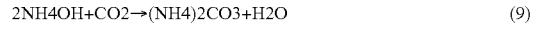   (9)

Overall Reaction, Combining Reactions 4, 5, 6, 7, 8, 9, Using Natural Gas, Air, and Water to Produce Steam for Power Production and Ammonium Carbonate Fertilizer in an Integrated Power Plant.

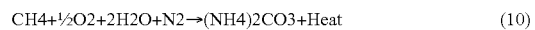   (10)

Ammonium carbonate is not stable and will decompose to release ammonia and carbon dioxide into the atmosphere. The ammonium carbonate can be converted to more stable ammonium carbamate or urea compounds.

If the source of natural gas is in arid climates the ammonium carbonate can be reacted with gypsum (naturally occurring calcium sulfate) to produce calcium carbonate for disposal and ammonium sulfate fertilizer that is more suitable for the alkaline soils found in arid climates Calcium Sulfate Metathesis Reaction

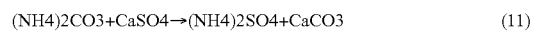   (11)

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. An electric power generation system comprising:
   an autoclave coupled to a natural gas source, an oxygen source, and having a pressure reducing outlet valve;
   a high-pressure pump coupled to the autoclave for providing a solution of ammonium hydroxide and ammonium carbonate solution under pressure to the autoclave thereby creating an exothermic reaction forming an ammonium carbonate solution;
   a heat exchanger coupled to the autoclave for generating high-pressure steam from heat created by the exothermic reaction; and
   an electrical power generator coupled to the heat exchanger for receiving the high-pressure steam to generate electrical power.

2. The electric power generation system as claimed in claim 1 further including a pressure let down system coupled to the pressure reducing valve of the autoclave for receiving and cooling the ammonium carbonate solution from the autoclave;
   an ammonium carbonate crystallizer coupled to the pressure let down system for receiving a first portion of the ammonium carbonate solution for the formation of crystallized ammonium carbonate fertilizer; and
   a storage vessel coupled to the pressure let down system for receiving a second portion of the ammonium carbonate solution from the pressure let down system, the storage vessel coupled to the high-pressure pump to provide ammonium carbonate solution thereto.

3. The electric power generation system as claimed in claim 2 further including an ammonium hydroxide source coupled to the storage vessel for adding ammonium hydroxide to the second portion of ammonium carbonate solution at a rate to maintain the concentration of ammonium carbonate near a saturation point.

4. The electric power generation system as claimed in claim 3 wherein the rate at which ammonium hydroxide is added will be a slight excess of the stoichiometric amount need to react with CO2.

5. The electric power generation system as claimed in claim 1 wherein the autoclave operates at temperatures between 180° C. and 265° C. (360-510° F.) and operates at pressures between 10 and 50 bars (140-725 psig).

6. The electric power generation system as claimed in claim 1 wherein the crystallizer is a chilled crystallizer.

7. An electric power generation system comprising:
   a high-pressure autoclave having a first inlet coupled to a natural gas source, a second inlet coupled to an oxygen source, and a pressure reducing outlet valve;
   a high-pressure pump coupled to the high-pressure autoclave through a third inlet for providing a solution of ammonium hydroxide and ammonium carbonate solution under pressure;
   a heat exchanger coupled to the high-pressure autoclave having a low-pressure steam inlet and a high-pressure steam outlet;
   an electrical power generator coupled to the high-pressure steam outlet to generate electrical power from high-pressure steam received therefrom and having a low-pressure steam outlet for transporting low-pressure steam as waste heat from power generation;
   a pressure let down system coupled to the pressure reducing valve, the pressure let down system including a tank for receiving an ammonium carbonate solution from the high-pressure autoclave through the pressure reducing valve;
   an ammonium carbonate crystallizer coupled to the tank for receiving a first portion of the ammonium carbonate solution from the tank for formation of crystallized ammonium carbonate fertilizer;
   a storage vessel receiving a second portion of the ammonium carbonate solution, the storage vessel is coupled to the high-pressure pump to provide ammonium carbonate solution thereto; and
   an ammonium hydroxide source is coupled to the storage vessel for adding ammonium hydroxide to the second portion of ammonium carbonate solution at a rate to maintain the concentration of ammonium carbonate near a saturation point.

8. The electric power generation system as claimed in claim 7 wherein the pressure let down system further includes tank coils coupled to the tank for cooling the ammonium carbonate solution, the tank coils having an outlet coupled to the low-pressure steam inlet of the heat exchanger of the high-pressure autoclave.

9. The electric power generation system as claimed in claim 8 wherein the ammonium carbonate crystallizer includes a vessel and a heat exchanger coupled to the vessel, the heat exchanger having an inlet coupled to the low-pressure steam outlet of the electrical power generator for receiving the low-pressure steam therefrom, and an outlet coupled to an inlet of the tank coils.

10. The electric power generation system as claimed in claim 7 wherein the rate at which ammonium hydroxide is added will be a slight excess of the stoichiometric amount need to react with CO2.

11. The electric power generation system as claimed in claim 9 further including a cooling tower coupled between the tank coils coupled to the tank and the heat exchanger coupled to the vessel.

12. The electric power generation system as claimed in claim 7 wherein the high-pressure autoclave is a refractory lined steel autoclave vessel capable of operating at high temperature and pressure.

13. The electric power generation system as claimed in claim 7 wherein the high-pressure autoclave operates at temperatures between 180° C. and 265° C. (360-510° F.) and operates at pressures between 10 and 50 bars (140-725 psig).

14. A method of electric power generation comprising the steps of:
   injecting natural gas, oxygen, a solution of ammonium hydroxide and ammonium carbonate solution into a high-pressure autoclave under pressure to create an exothermic reaction forming an ammonium carbonate solution;
   creating high-pressure steam from the heat of the exothermic reaction; and
   sending the high-pressure steam to an electrical power generator to generate electrical power.

15. The method of electric power generation as claimed in claim 14 further comprising the steps of:
   using a pressure reducing valve on the high-pressure autoclave to move the ammonium carbonate solution from the high-pressure autoclave to a tank; and
   receiving a portion of the ammonium carbonate in a crystallizer to form an ammonium carbonate fertilizer.

16. The method of electric power generation as claimed in claim 14 wherein the step of injecting the solution of ammonium hydroxide and ammonium carbonate solution into the high-pressure autoclave includes the step of providing a high-pressure pump coupled between the high-pressure autoclave and a source of a solution of ammonium hydroxide and ammonium carbonate solution.

17. The method of electric power generation as claimed in claim 16 wherein the step of providing a high-pressure pump coupled between the high-pressure autoclave and a source of a solution of ammonium hydroxide and ammonium carbonate solution includes providing a storage vessel as the source of the solution of ammonium hydroxide and ammonium carbonate solution, coupled to the tank for receiving another portion of the ammonium carbonate solution.

18. The method of electric power generation as claimed in claim 17 further including the step of adding ammonium hydroxide from an ammonium hydroxide source to the storage vessel at a rate to maintain the concentration of ammonium carbonate near a saturation point.

19. The method of electric power generation as claimed in claim 14 wherein the step of creating high-pressure steam from the heat of the exothermic reaction includes generating high-pressure steam within a heat exchanger coupled to the high-pressure autoclave.

20. The method of electric power generation as claimed in claim 19 wherein the rate at which ammonium hydroxide is added will be a slight excess of the stoichiometric amount need to react with CO2.

21. The method of electric power generation as claimed in claim 14 wherein the high-pressure autoclave operates at temperatures between 180° C. and 265° C. (360-510° F.) and operates at pressures between 10 and 50 bars (140-725 psig).

\* \* \* \* \*